(12) United States Patent
Leys

(10) Patent No.: US 8,726,935 B2
(45) Date of Patent: May 20, 2014

(54) VALVE MANIFOLD ASSEMBLY

(75) Inventor: John A. Leys, Chaska, MN (US)

(73) Assignee: Entrgeris, Inc., Billerica, MA (US)

( * ) Notice: Subject to any disclaimer, the term of this patent is extended or adjusted under 35 U.S.C. 154(b) by 1025 days.

(21) Appl. No.: 12/373,840

(22) PCT Filed: Jul. 13, 2007

(86) PCT No.: PCT/US2007/015940
§ 371 (c)(1),
(2), (4) Date: Jun. 19, 2009

(87) PCT Pub. No.: WO2008/008465
PCT Pub. Date: Jan. 17, 2008

(65) Prior Publication Data
US 2009/0255596 A1    Oct. 15, 2009

Related U.S. Application Data

(60) Provisional application No. 60/831,070, filed on Jul. 14, 2006.

(51) Int. Cl.
*F16K 11/22* (2006.01)
*F16K 11/24* (2006.01)
*F16K 27/02* (2006.01)
*F16K 1/32* (2006.01)

(52) U.S. Cl.
USPC .......... 137/606; 137/597; 137/897; 251/61.4; 251/63.6

(58) Field of Classification Search
USPC ............ 137/606, 599.03, 597, 897; 251/61.4, 251/63.6
See application file for complete search history.

(56) References Cited

U.S. PATENT DOCUMENTS

| | | | | |
|---|---|---|---|---|
| 1,463,735 A | * | 7/1923 | Varrieur | 251/100 |
| 3,561,468 A | | 2/1971 | Sugden, Jr. | |
| 3,572,366 A | | 3/1971 | Wiggins | |
| 3,797,524 A | | 3/1974 | Sanelli | |
| 3,857,513 A | * | 12/1974 | Wiggins | 239/70 |
| 4,276,902 A | | 7/1981 | Roth | |
| 4,290,450 A | * | 9/1981 | Swanson | 137/606 |
| 5,058,624 A | * | 10/1991 | Kolze | 137/607 |
| 5,234,032 A | * | 8/1993 | Kline et al. | 137/884 |
| 6,192,932 B1 | | 2/2001 | Izumo et al. | |
| 6,575,187 B2 | | 6/2003 | Leys et al. | |
| 6,652,008 B2 | | 11/2003 | Fischer et al. | |
| 6,715,510 B2 | * | 4/2004 | Herbert | 137/884 |
| 7,726,335 B2 | * | 6/2010 | Doble | 137/542 |
| 2003/0197382 A1 | | 10/2003 | Fischer et al. | |

* cited by examiner

*Primary Examiner* — Atif Chaudry
(74) *Attorney, Agent, or Firm* — Christensen Fonder P.A.

(57) ABSTRACT

A valve manifold assembly including a manifold body defining a primary flow passage and a secondary flow passage fluidly coupled therewith through an aperture in the wall of the primary flow passage. A valve including a head portion and a stem extending therefrom is disposed through the aperture. The head portion has a valve sealing surface adjacent and extending around the stem, and a valve seat having a seat sealing surface facing into the primary flow passage extends around the aperture. The valve is selectively shiftable between a closed position wherein the valve sealing surface is sealingly engaged with the seat sealing surface to block fluid flow between the secondary flow passage and the primary flow passage, and an open position wherein the valve sealing surface is spaced apart from the seat sealing surface to enable fluid flow between the secondary flow passage and the primary flow passage.

15 Claims, 5 Drawing Sheets

VALVE MANIFOLD ASSEMBLY

RELATED APPLICATIONS

This application claims the benefit of U.S. Provisional Patent Application No. 60/831,070 entitled VALVE MANIFOLD COMBINATION, filed Jul. 14, 2006, and hereby fully incorporated herein by reference.

FIELD OF THE INVENTION

The present invention relates to valves, and more particularly, to a valve manifold assembly for mixing secondary fluids into a primary fluid.

BACKGROUND OF THE INVENTION

Various types of valves are used in the semiconductor industry to control fluid transport and to mix fluids, including highly pure and highly caustic fluids. Although prior valve-manifold combinations effectively provide for the transport and mixing of multiple fluids, they still present certain drawbacks that are not desirable in particular semiconductor applications.

For example, some prior manifolds produce quiescent or dead spots in the primary fluid flow duct which could cause fluids to become stagnant and degrade or could trap solids resulting from fluid contamination. Typically, mixing valves supply secondary fluids by way of an inlet duct flowing into a primary fluid flow duct with the valving located away from the primary fluid flow duct. The duct between the valving and the main flow duct creates such a quiescent or dead spot and can inhibit mixing of the secondary fluid with the primary fluid.

This has been addressed to some extent in the devices disclosed in U.S. Pat. No. 6,192,932. These valve manifolds have a valve with a stem extending through the primary fluid flow duct and a head that seats on a valve seat on the opposite side of the chamber. This arrangement, however, may cause additional potential dead spots in the primary fluid flow duct and disrupts or obstructs the fluid flow by the valve stem extending directly through the middle of the primary fluid flow duct. Such an arrangement may cause excessive pressure drop in the primary duct and subjects large portions of the valve to the primary fluid flow whether the valve is open or closed.

Accordingly, there exists a need in the semiconductor industry for an improved mixing valve manifold assembly and associated methods of eliminating or minimizing dead space and removing or minimizing obstructions that disrupt the main fluid flow duct.

SUMMARY OF THE INVENTION

An improved valve manifold combination system and associated methods of eliminating dead space and obstructions in the a main fluid flow duct of the manifold and minimizing exposure of the operative portions of the valve to the primary fluid duct are described herein. The invention in an embodiment includes a manifold with a main fluid flow duct and at least one valve mounted on the manifold in a valve region. The at least one valve has a valve stem with a valve member preferably driven pneumatically, which controls the supply of secondary fluid from a secondary duct, preferably positioned in the manifold, into a primary fluid in the main fluid flow duct. The valve member seats on a valve seat located at the peripheral region of the main fluid flow duct, with the valve seat facing inwardly with respect to the main fluid flow duct. The valve stem extends away from the main fluid flow duct to a valve actuator.

In an embodiment the main fluid flow duct is substantially continuous through the main fluid flow duct without discontinuities, and substantially no expansion of the fluid flow duct in the valve region. In a further embodiment there can be some expansion in the region of the valve seat with the balance of the main fluid flow duct having no expansion of the fluid flow duct in the valve region.

According to an embodiment, a valve manifold assembly for mixing a plurality of fluid flow streams includes a manifold body portion defining a primary flow passage and at least one secondary flow passage with the secondary flow passage fluidly coupled with the primary flow passage through an aperture in a wall of the primary flow passage. The aperture is defined by a periphery with a valve seat extending around the periphery. The valve seat presents a seat sealing surface facing into the primary flow passage. The assembly further includes a valve with a fluid control portion with a head portion having a first diameter dimension and a stem portion extending from the head portion. The stem portion has a second diameter dimension smaller than the first diameter dimension. The head portion presents a valve sealing surface adjacent and extending around the stem portion. The fluid control portion extends through the aperture such that the head portion is substantially in the primary flow passage and the stem portion extends through the aperture. The valve is selectively shiftable between a closed position wherein the valve sealing surface is sealingly engaged with the seat sealing surface to block fluid flow between the secondary flow passage and the primary flow passage, and an open position wherein the valve sealing surface is spaced apart from the seat sealing surface to enable fluid flow between the secondary flow passage and the primary flow passage. Due to the positioning of the fluid control portion with only the head portion in the primary flow passage, the primary flow passage is substantially free from obstruction or discontinuities caused by the valve.

In further embodiments, the manifold body portion may define a plurality of separate secondary flow passages, each of the secondary flow passages fluidly coupled with the primary flow passage through a separate aperture in a wall of the primary flow passage. A plurality of valves is coupled with the manifold body, each valve having a fluid control portion extending through a separate one of the apertures.

The assembly may further include at least one actuator operably coupled with the valve for selectively shifting the valve between the closed position and the open position. The actuator may include a biasing element operably coupled with the valve that may be either arranged to bias the valve toward the closed position or arranged to bias the valve toward the open position. Further, the actuator may include a handle operably coupled with the valve for manually shifting the valve between the closed position and the open position.

In some embodiments, the actuator includes a housing and a driving element in the housing, the driving member operably coupled with the valve and selectively shiftable within the housing to shift the valve between the closed position and the open position. The driving element may be a piston sealingly engaged with an inner surface of the wall of the housing or a diaphragm.

In an embodiment, a valve manifold assembly for mixing a plurality of fluid flow streams includes a manifold body portion defining a primary flow passage and at least one secondary flow passage, the secondary flow passage fluidly coupled with the primary flow passage through an aperture in a wall of the primary flow passage, the aperture defined by a periphery with a valve seat extending around the periphery. The valve seat presents a seat sealing surface facing into the primary flow passage. The assembly includes at least one valve including a fluid control portion with a head portion having a first diameter dimension and a stem portion extending from the head portion, the stem portion having a second diameter dimension smaller than the first diameter dimension. The head portion presents a valve sealing surface adjacent and extending around the stem portion. The fluid control portion extends through the aperture and the valve is selectively shiftable between a closed position wherein the valve sealing surface is sealingly engaged with the seat sealing surface to block fluid flow between the secondary flow passage and the primary flow passage, and an open position wherein the valve sealing surface is spaced apart from the seat sealing surface to enable fluid flow between the secondary flow passage and the primary flow passage. The assembly further includes means for selectively shifting the valve between the closed position and the open position. The means for selectively shifting the valve between the closed position and the open position may include at least one actuator.

In an embodiment, a valve manifold assembly for mixing a plurality of fluid flow streams includes a manifold body portion defining a primary flow passage and a plurality of secondary flow passages, each secondary flow passage fluidly coupled with the primary flow passage through an aperture in a wall of the primary flow passage, and a plurality of valves. Each valve includes a fluid control portion having a head portion and a stem portion extending from the head portion. The fluid control portion of each valve extends through a separate one of the apertures and each valve is selectively shiftable between a closed position wherein the head portion is sealingly engaged in the aperture to block fluid flow between the secondary flow passage and the primary flow passage, and an open position wherein the head portion is spaced apart from the aperture to enable fluid flow between the secondary flow passage and the primary flow passage; and An advantage and feature of some embodiments is that by arranging the valve stem with only the head portion of the fluid control portion extending into the main fluid flow duct, when the valve is closed, minimal flow obstruction and dead space is created. The valve opens by the valve member moving inwardly into the main fluid flow duct providing minimal exposure of the valve stem to the primary fluid.

Another advantage and feature of some embodiments of the invention is that minimal or no discontinuities to the primary fluid flow passage are caused by the valve seat due to its location substantially at the wall of the primary flow passage.

Further objects and advantages of particular embodiments of the present invention may become apparent to those skilled in the art upon review of the figures and descriptions of the present invention herein.

BRIEF DESCRIPTION OF THE DRAWINGS

The invention may be more completely understood in consideration of the following detailed description of various embodiments of the invention in connection with the following drawings, in which.

Figure 1:
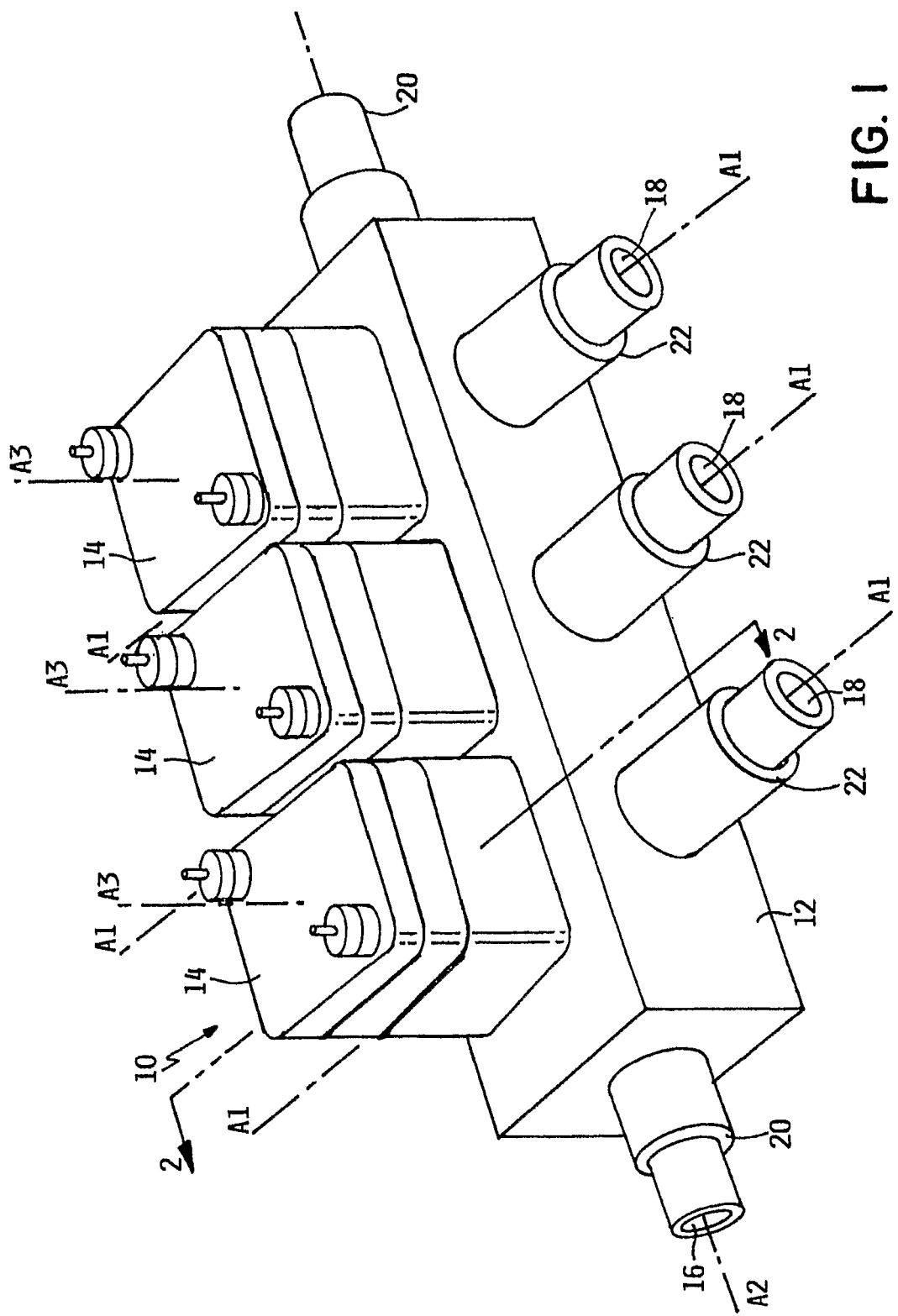
FIG. 1 is a perspective view of a valve manifold assembly according to an embodiment of the invention.

While the invention is amenable to various modifications and alternative forms, specifics thereof have been shown by way of example in the drawings and will be described in detail. It should be understood, however, that the intention is not to limit the invention to the particular embodiments described. On the contrary, the intention is to cover all modifications, equivalents, and alternatives falling within the spirit and scope of the invention as defined by the appended claims.

DETAILED DESCRIPTION OF THE INVENTION

A mixing valve manifold assembly 10 is depicted in FIG. 1 and generally includes a manifold body portion 12 and a plurality of valve assemblies 14. Manifold body portion 12 defines a primary flow passage 16 oriented along longitudinal axis A2 and a plurality of secondary flow passages 18 oriented along axes A1 extending generally transverse to primary flow passage 16. Manifold body portion 12 further includes primary flow connectors 20 at each end of primary flow passage 16 for coupling tubing (not depicted), and secondary flow connectors 22 are provided for connecting tubing 24 to secondary flow passages 18. Connectors 20, 22, may be a conventional Flaretek® fitting, available from Entegris, Inc, the owner of the instant invention. Connectors 20, 22, manifold body portion 12, and any other wetted components may preferably be formed of fluoropolymers, such as PFA (perfluoroalkoxy), PTFE (polytetrafluoroethylene), or modified PTFE (for example NXT70 by Dupont).

Figure 2:
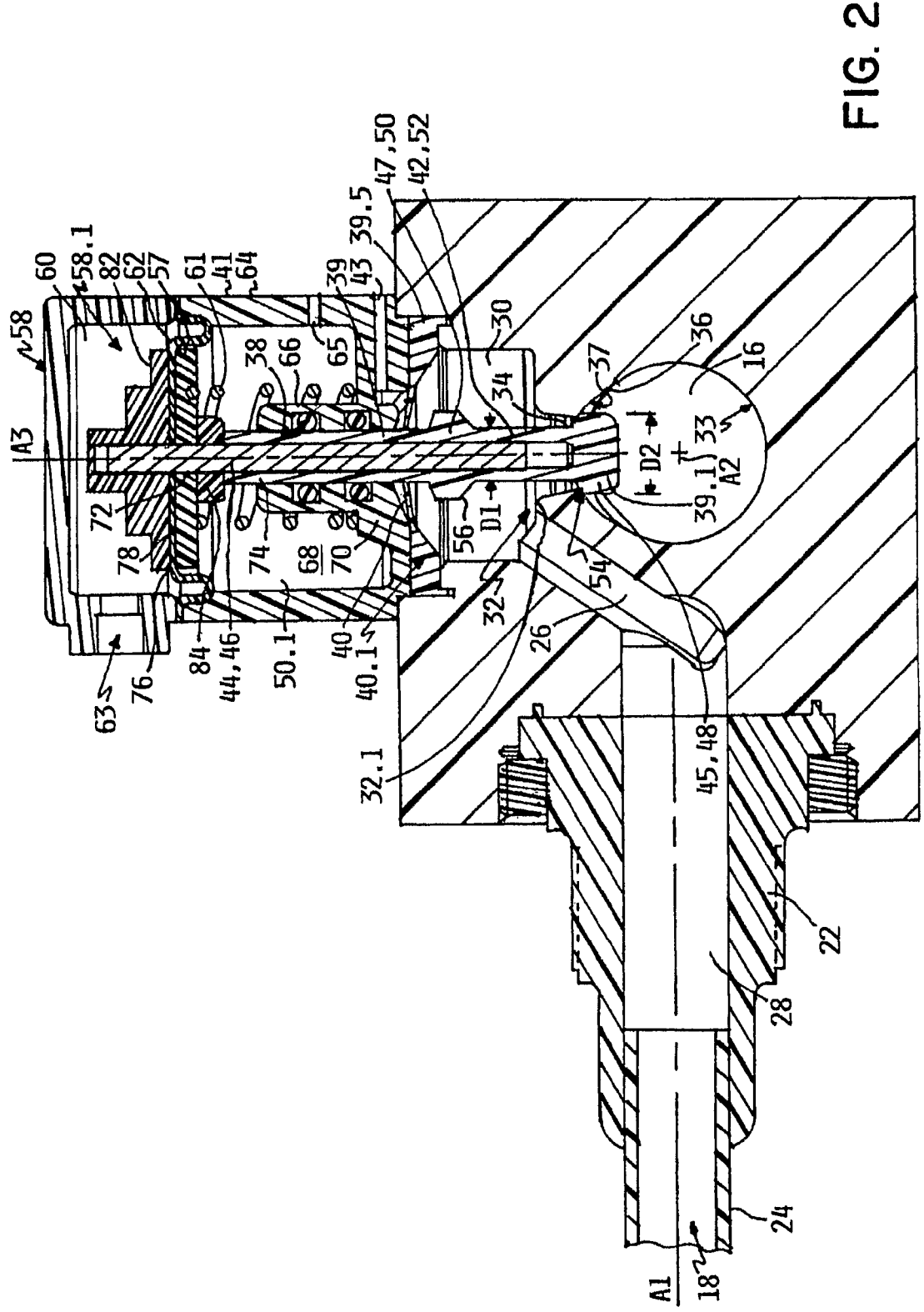
FIG. 2 is a cross-sectional view of the valve manifold assembly of FIG. 1 taken at section 2-2 of FIG. 1.

Referring now to FIG. 2, secondary flow passage 18 generally includes intake conduit portion 26, outer portion 28 oriented along axis A1, valve chamber 30, and aperture 32, defining a flow path for fluid communication between secondary flow connector 22 and primary flow passage 16 which is oriented along axis A2.

Aperture 32 is defined in wall 33 of primary flow passage 16 and generally includes upper inlet portion 34 and valve seat 36. Valve seat 36 includes seat sealing surface 37 extending around the periphery of aperture 32 and facing into primary flow passage 16.

Valve 38 generally includes valve stem 39 and fluid control portion 42. Valve stem 39 generally includes a wetted diaphragm 39.5 configured as a valve stem skirt 40 and a control rod 44 made of stainless steel. Valve stem skirt 40 has concave portion 40.1. Valve stem skirt 40 is preferably integrally formed with fluid control portion 42. Diaphragm 39.5 seals to prevent controlled fluid from leaking from secondary flow passage 18 into valve housing 41. Leak detection vent 43 is formed in housing 41 proximate to diaphragm 39.5 to enable detection of fluid leakage from valve chamber 30 or operate as a vent to accommodate flexing movement of diaphragm 39.5. Valve 38 and any other wetted components may preferably be formed of fluoropolymers, such as PFA (perfluoroalkoxy), PTFE (polytetrafluoroethylene), or modified PTFE (for example NXT70 by Dupont).

Fluid control portion 42 is hourglass-shaped and is preferably molded from modified PTFE (NXT70 by Dupont). Fluid control portion 42 controls the opening and closing of aperture 32, thereby controlling the fluid flow between valve chamber 30 and primary flow passage 16. Fluid control portion 42 generally includes poppet 45 defining a control rod receptacle 46 for receiving the control rod 44, and including head portion 48 and stem portion 52. Stem portion 52 presents first diameter dimension D1 and head portion 48 defines second diameter dimension D2 smaller than D1. In an embodiment, fluid flow portion 42 may have at least one additional poppet 47.

In an embodiment of the invention, head portion 48 defines valve sealing surface 54 adjacent and extending around stem portion 52 for engaging and sealing with seat sealing surface 37 of valve seat 36. In an embodiment of the invention, at least one additional structure can be added to function as a second poppet 50 defining a second oppositely facing valve sealing surface 56 adjacent and extending around stem portion 52.

Poppet 45 is preferably press-fit assembled within aperture 32 resulting in head portion 48 being disposed substantially in primary flow passage 16 with valve sealing surface 54 positioned proximate and confronting seat sealing surface 37. Stem portion 52 extends through aperture 32 into valve chamber 30 of secondary flow passage 18. In one embodiment of the present invention, not depicted, valve sealing surface 56 of second poppet 50 may be positioned proximate and confronting an upwardly facing seat sealing surface 32.1 defined by upper inlet portion 34.

Bulbous portion 39.1 of head portion 48 may be press-fit through aperture 32 from valve chamber 30. One suitable press-fitting process is disclosed in U.S. Pat. No. 6,575,187, hereby fully incorporated herein by reference.

Valve actuator assembly 57 selectively reciprocatingly shifts valve 38 along third axis A3 between two positions. In a closed position, valve sealing surface 54 sealingly engages seat sealing surface 37 thereby blocking secondary fluid flow from the secondary flow passage 18 through aperture 32 into the primary fluid in primary flow passage 16. In the open position, valve sealing surface 54 is spaced apart from seat sealing surface 37 thereby enabling secondary fluid flow from the secondary flow passage 18 through aperture 32 into the primary fluid in primary flow passage 16.

Valve actuator assembly 57 generally includes valve actuator housing 58 which defines an enclosure 58.1 including upper pressurizable portion 60 and lower mechanism housing 61. Pressurizable portion 60 is sealed from lower mechanism housing 61 by an actuator diaphragm 62, preferably made of a double coated Viton® and Nomex® available from Dupont, and has an adjustable interior pressure which can be adjusted through a pressure control port 63 between a low pressure setting and a high pressure setting corresponding to the closed position of FIG. 1 and the open position. Lower mechanism housing 61 has base portion 64, pedestal 66 extending from base portion 64, air vent 65, and open interior 68. Base portion 64 has concave portion 70 which limits the upward movement of valve stem 39. Pedestal 66 has bore 72 sized to receive valve stem 39 and is configured to guide valve stem 39 along third axis A3, which is transverse to first and second axes A1, A2. Air vent 65 prevents air from being compressed in the open interior 68 facilitating operation of the actuator. O-rings 74, contained within pedestal 66, form a seal between pedestal 66 and valve stem 39.

Diaphragm 62 generally includes shoulder portion 76 which acts to seal pressurizable portion 60, extendable planar portion 78, flexible ring 80 attaching shoulder portion 76 to planar portion 78, and an aperture (not depicted) for receiving valve stem 39. Top and bottom rigid members 82, 84 attach to the top and bottom of extendable planar portion 78, respectively, and couple the top portion of control rod 44 to diaphragm 62 and to seal the aperture in diaphragm 62.

Valve stem 39 extends through lower mechanism housing 61, o-rings 74, a biasing element in the form of spring 86, nut 84, and the aperture of diaphragm 62, and couples to top rigid member 82 at the exposed portion of control rod 44. Nut 84 is threaded on control rod 44, and secures top and bottom rigid members 82, 84 and planar portion 78 of diaphragm 62. U.S. Pat. No. 6,575,187, discloses various suitable attachment means and methods, and is hereby fully incorporated herein by reference. Spring 86, contained within open interior 68 of lower mechanism housing 61, contacts bottom rigid member 84 and produces an upward biasing force on valve 38 to bias it toward the closed position.

The range of motion of valve 38 along the third axis A3 is typically limited in the upward direction by the engagement of valve sealing surface 54 with seat sealing surface 37 and in the downward direction by bottom rigid member 84 engaging upper pedestal portion 67. In one embodiment of the present invention, not shown, motion of valve stem 38 may be limited in the downward direction by engagement of valve sealing surface 56 with seat sealing surface 32.1

When the interior pressure of pressurizable portion 60 is at a non actuating low pressure state, such as depicted in FIG. 1, spring 86 urges valve 38 toward the closed position with valve sealing surface 54 sealingly engaged with seat sealing surface 37. Poppet 45 and valve seat 36 are appropriately configured with respect to one another so that the biasing force provided by spring 86 as well as the force of any fluid pressure on poppet 45 are not sufficient to force head portion 48 back through aperture 32. When the interior pressure of pressurizable portion 60 is increased by the admittance of air through pressure control port 63, diaphragm 62 and valve 38 are urged against the bias of spring 86 into the open position.

Figure 3:
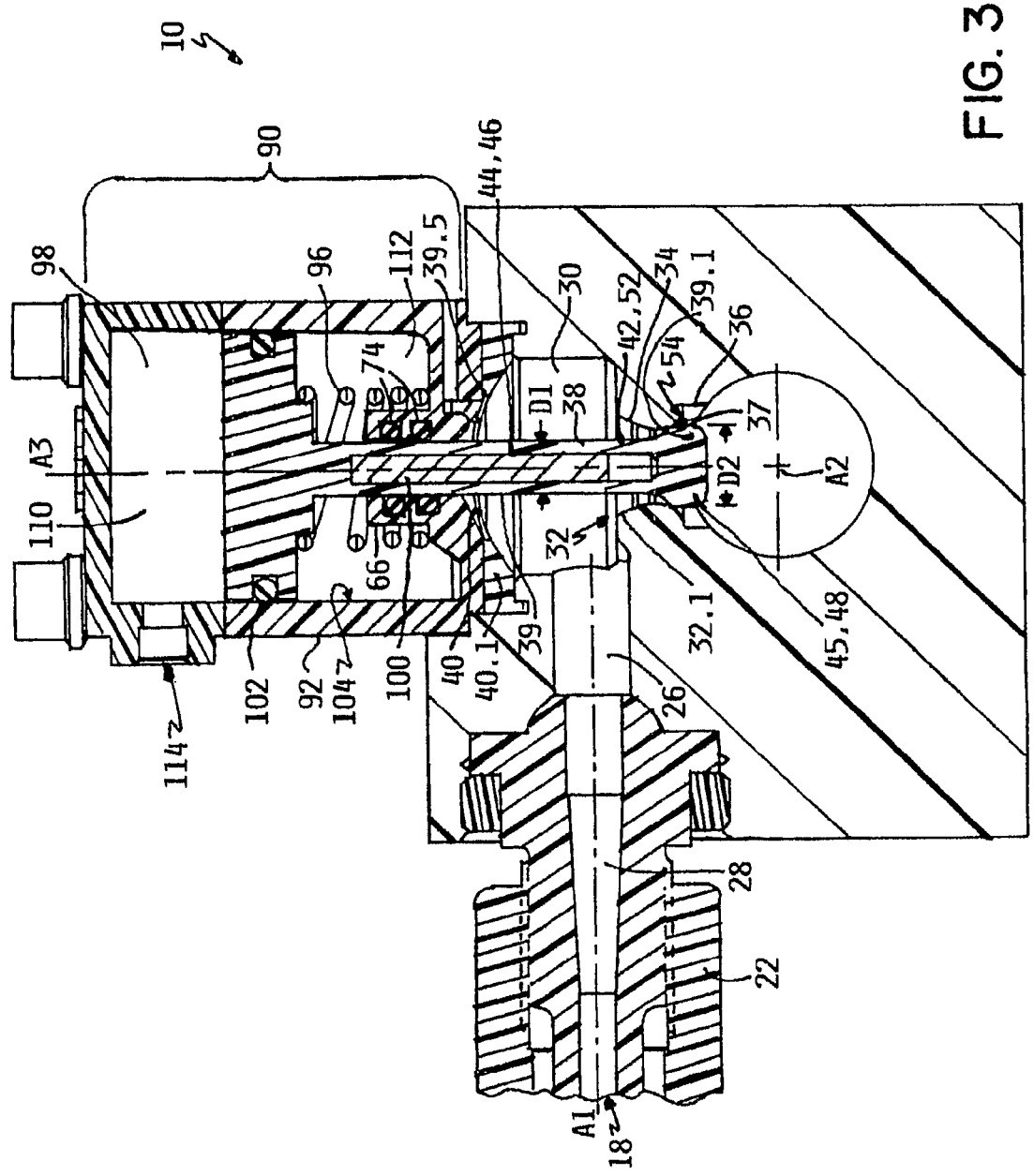
FIG. 3 is a cross-sectional view of an alternative embodiment of the valve manifold assembly taken at section 2-2 of FIG. 1.
Figure 4:
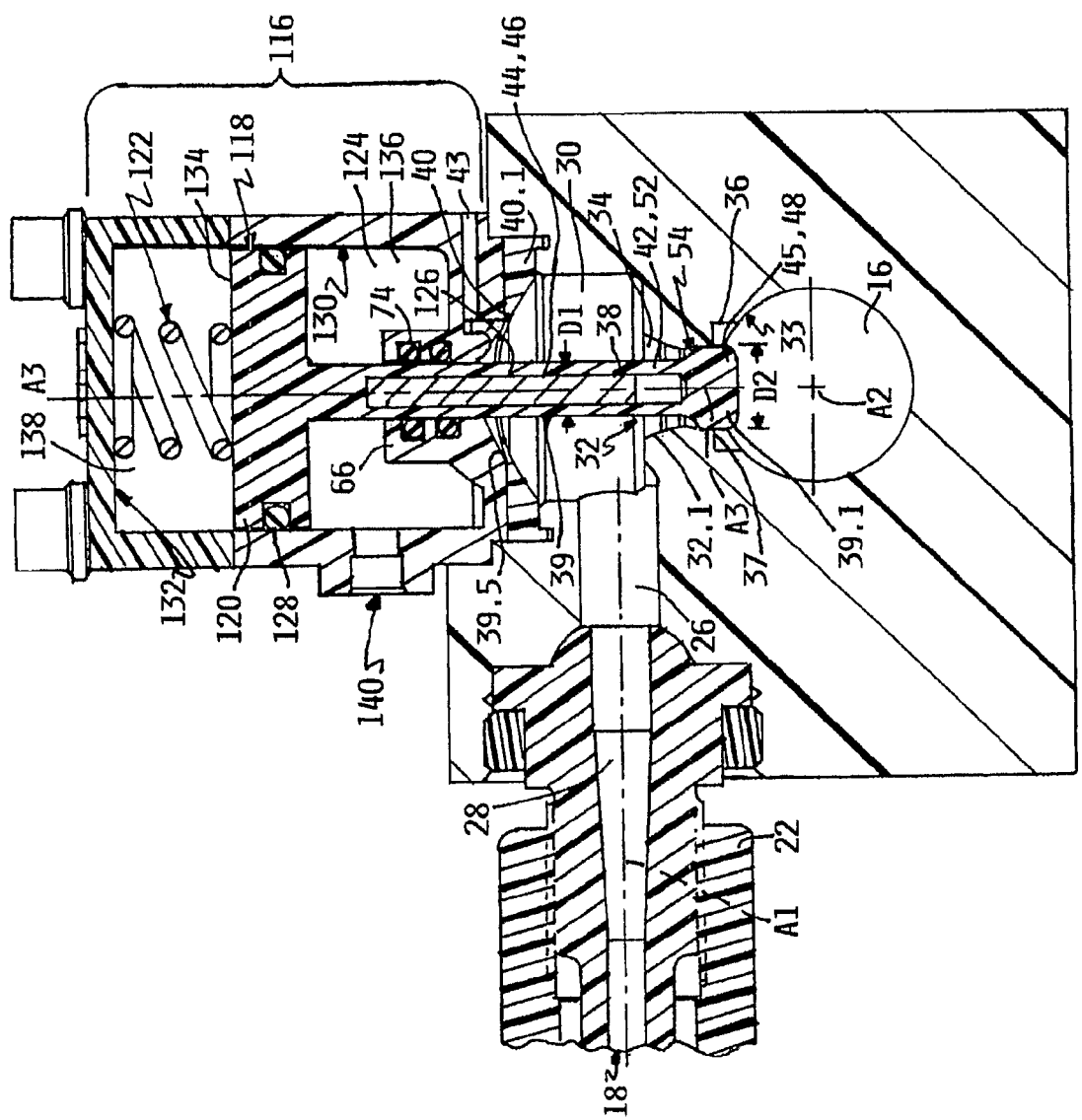
FIG. 4 is a cross-sectional view of another alternative embodiment of the valve manifold assembly taken at section 2-2 of FIG. 1.
Figure 5:
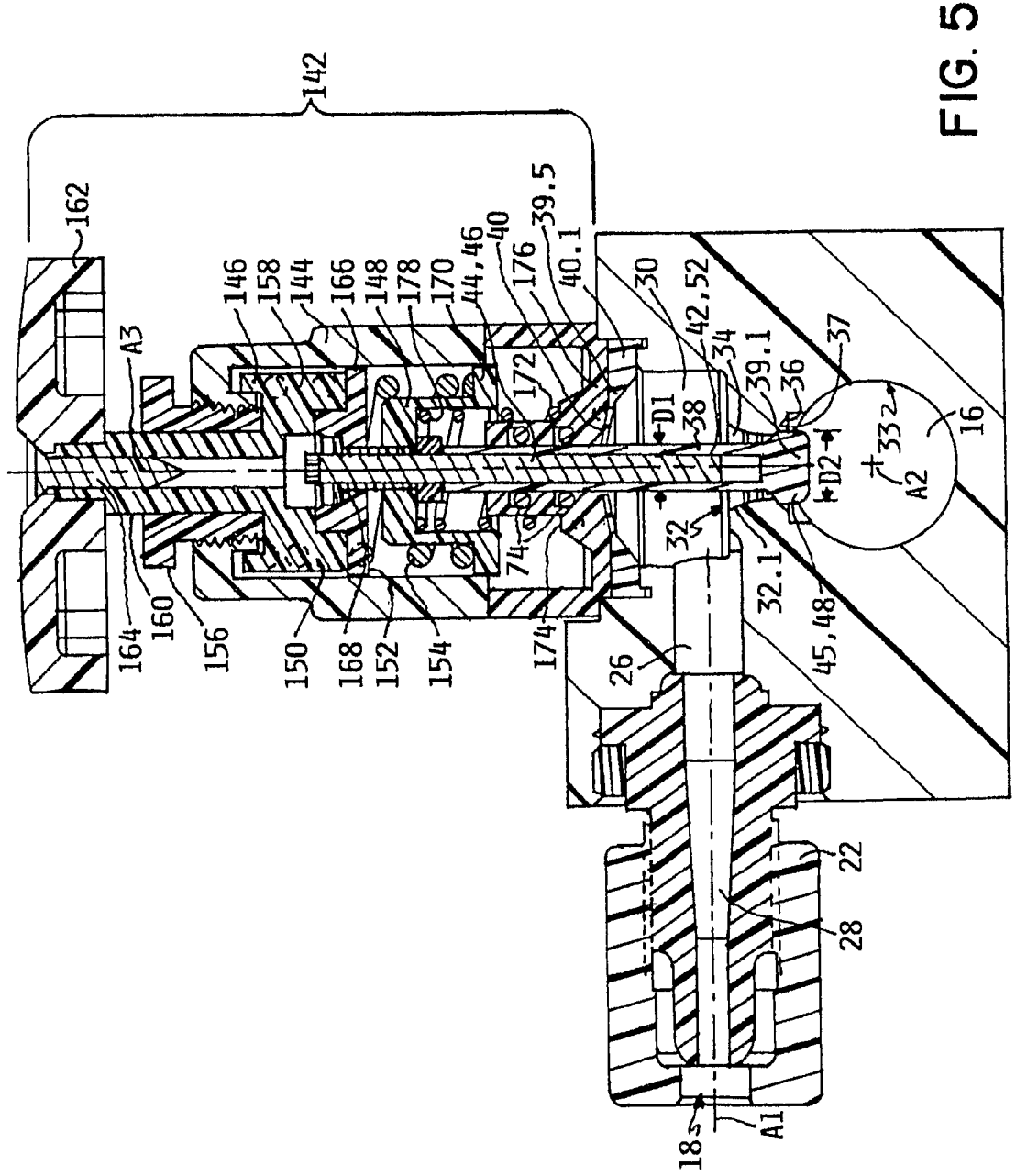
FIG. 5 is a cross-sectional view of yet another alternative embodiment of the valve manifold assembly taken at section 2-2 of FIG. 1.

In FIGS. 3, 4, and 5, various alternative embodiment of the valve manifold of the present invention are depicted. In the embodiment of FIG. 3, actuator assembly 90 generally includes housing 92) piston 94, and biasing element 96. Housing 92 defines enclosure 98. Piston 94 is operably coupled to valve 38 and may be integrally molded with valve stem 39 or may be separately formed and attached with coupling rod 100. O-ring 102 sealingly engages with wall 104 of housing 92. Piston 94 is reciprocatingly slidable within housing 92. Biasing element 96 is disposed between lower surface 106 of housing 92 and lower surface 108 of piston 94, and biases piston 94 and valve 38 in an upward direction toward the closed position.

Piston 94 divides enclosure 98 into an upper pressurizable portion 110 and a lower mechanism housing 112. In use, when the interior pressure of pressurizable portion 110 is at a non actuating low pressure state, such as depicted in FIG. 3, biasing element 96 urges valve 38 toward the closed position with valve sealing surface 54 sealingly engaged with seat sealing surface 37. When the interior pressure of pressurizable portion 110 is increased by the admittance of air through pressure control port 114, piston 94 and valve 38 are urged against the bias of biasing element 96 into the open position.

In the normally open valve embodiment of FIG. 4, actuator assembly 116 generally includes housing 118, piston 120, and biasing element 122. Housing 118 defines enclosure 124. Piston 120 is operably coupled to valve 38 and may be integrally molded with valve stem 39 or may be separately formed and attached with coupling rod 126. O-ring 128 sealingly engages with wall 130 of housing 118. Piston 120 is reciprocatingly slidable within housing 118. Biasing element 122 is disposed between lower surface 132 of housing 118 and upper surface 134 of piston 120, and biases piston 120 and valve 38 in an downward direction toward the open position.

Piston 120 divides enclosure 124 into a lower pressurizable portion 136 and an upper mechanism housing 138. In use, when the interior pressure of pressurizable portion 136 is at a non actuating low pressure state, such as depicted in FIG. 4, biasing element 122 urges valve 38 toward the closed position with valve sealing surface 54 sealingly engaged with seat sealing surface 37. When the interior pressure of pressurizable portion 136 is increased by the admittance of air through pressure control port 140, piston 120 and valve 38 are urged against the bias of biasing element 122 into the open position.

In the manually operated embodiment of FIG. 5, actuator assembly 142 generally includes housing 144, drive assembly 146 and valve biasing assembly 148. Drive assembly 146 generally includes handle assembly 150, valve coupling assembly 152, drive biasing element 154, and packing nut 156. Handle assembly 150 generally includes drive member 158 having a stem portion 160 which extends upwardly through an aperture in packing nut 156. Manual handle 162 is rotationally fixed to stem portion 160 and is secured in place with fastener 164. Valve coupling assembly 152 generally includes retainer 166 which defines a bore, through which valve stem 39 is received. Retainer 166 is fixed against sliding on valve stem 39 with keeper 168.

Valve biasing assembly 148 generally includes cup retainer 170 and valve biasing element 172. Valve biasing element 172 is disposed between shoulder 174 formed in lower wall 176 of housing 144 and cup retainer 170. Cup retainer 170 is fixed against sliding relative to valve stem 39 with keeper 178. Drive biasing element 154 is disposed between retainer 166 and cup retainer 170.

In use, with manual handle 162 in a first closed position such as depicted in FIG. 5, valve biasing element 172 urges valve 38 toward the closed position with valve sealing surface 54 sealingly engaged with seat sealing surface 37. When manual handle 162 is rotated, drive member 158, cup retainer 170, and valve 38, which is operably coupled thereto, are urged downwardly against the bias of valve biasing element 172 into the open position.

The embodiments above are intended to be illustrative and not limiting. Additional embodiments are encompassed within the scope of the claims. Although the present invention has been described with reference to particular embodiments, those skilled in the art will recognize that changes may be made in form and detail without departing from the spirit and scope of the invention. For purposes of interpreting the claims for the present invention, it is expressly intended that the provisions of Section 112, sixth paragraph of 35 U.S.C. are not to be invoked unless the specific terms "means for" or "step for" are recited in a claim.

What is claimed is:

1. A valve manifold assembly for mixing a plurality of fluid flow streams into a primary flow passage, the valve manifold comprising:
   a one-piece manifold body portion having a length, formed from fluoropolymer material and having a circular bore extending the entire length of the manifold body portion with a pair of connectors at each of two ends, the connectors in axial alignment with the circular bore, the circular bore defining the primary flow passage, the manifold body portion further having a plurality of secondary flow passages, the secondary flow passages each fluidly coupled with the primary flow passage through a plurality of respective apertures in a wall of the primary flow passage, each aperture defined by a periphery with a valve seat, each valve seat presenting a respective seat sealing surface facing into the primary flow passage and displaced radially out of a geometric cylinder defined by the circular bore in respective valve seat recesses, each valve seat being unitary with the one-piece manifold body portion;
   a plurality of valves, each including a one-piece fluid control portion molded from polymer material and with a head portion having a bulbous portion and having a first diameter dimension and having a stem portion extending from the head portion, each stem portion having a second diameter dimension smaller than the first diameter dimension, each head portion presenting a valve sealing surface adjacent and extending around the stem portion, each fluid control portion extending through one of the plurality of respective apertures such that each head portion is in the primary flow passage and the stem portion extends through the aperture, each of the plurality of valves being selectively shiftable between a closed position wherein the respective valve sealing surface is sealingly engaged with the respective seat sealing surface to block fluid flow between the respective secondary flow passage and the primary flow passage and wherein each bulbous portion of each head portion is positioned in the respective valve seat recess, and an open position wherein the respective valve sealing surface is spaced apart from the respective seat sealing surface to enable fluid flow between the respective secondary flow passage and the primary flow passage and wherein each bulbous portion of each head portion is displaced into the primary flow passage;
   wherein between the connectors at each of the two ends of the circular bore, there are no discontinuities other than at the valves; and
   a plurality of actuators operably coupled with the plurality of valves for selectively shifting each respective valve between the closed position and the open position.

2. The valve manifold assembly of claim 1, wherein each actuator includes a biasing element operably coupled with the respective valve.

3. The valve manifold assembly of claim 2, wherein each biasing element is arranged to bias the respective valve toward the closed position.

4. The valve manifold assembly of claim 2, wherein the biasing element is arranged to bias the valve toward the open position.

5. The valve manifold assembly of claim 1, wherein the actuator includes a handle operably coupled with the valve for manually shifting the valve between the closed position and the open position.

6. The valve manifold assembly of claim 1, wherein each actuator includes a housing and a driving element in the housing, each driving member operably coupled with the respective valve and selectively shiftable within the housing to shift the respective valve between the closed position and the open position.

7. The valve manifold assembly of claim 6, wherein the driving element comprises a piston sealingly engaged with an inner surface of the wall of the housing.

8. The valve manifold of claim 6, wherein each driving element comprises a diaphragm.

9. The valve manifold of claim 1, wherein the secondary flow passages are each oriented generally transverse to the primary flow passage.

10. The valve manifold of claim 1, wherein the primary flow passage is substantially free from obstruction by each valve when each valve is in the closed position.

11. A valve manifold assembly for mixing a plurality of fluid flow streams, the valve manifold comprising:

a one-piece manifold body portion molded from fluoropolymer material and defining a primary flow passage with a cylindrical bore extending from one end to an opposite end of the body portion and a plurality of secondary flow passages, each secondary flow passage fluidly coupled with the primary flow passage through an aperture in a wall of the primary flow passage, the apertures being the only discontinuities of the cylindrical bore intermediate the one end and the opposite end;

a plurality of valves, each valve including a one-piece fluid control portion molded from polymer material and having a head portion and a stem portion extending from the head portion, the fluid control portion of each valve extending through a separate one of the apertures, each valve being selectively shiftable between a closed position wherein the respective head portion is sealingly engaged in the aperture at a valve seat unitary and integral with the one-piece manifold body portion to block fluid flow between the respective secondary flow passage and the primary flow passage, and an open position wherein the respective head portion is spaced apart from the valve seat to enable fluid flow between the secondary flow passage and the primary flow passage, each valve seat positioned radially outward of a geometric cylinder defined by the cylindrical bore, the valve stems not extending into the primary flow passageway; and a plurality of actuators, each actuator operably coupled with a separate one of the valves.

12. The valve manifold of claim 11, wherein each of the secondary flow passages are oriented generally transverse to the primary flow passage.

13. The valve manifold of claim 11, wherein the primary flow passage is substantially free from obstruction by the valves when the valves are in the closed position.

14. The valve manifold assembly of claim 11, wherein each actuator includes a biasing element arranged to bias the valve toward the closed position.

15. The valve manifold assembly of claim 11, wherein each actuator includes a biasing element arranged to bias the valve toward the open position.

\* \* \* \* \*

UNITED STATES PATENT AND TRADEMARK OFFICE
CERTIFICATE OF CORRECTION

PATENT NO.           : 8,726,935 B2  
APPLICATION NO.    : 12/373840  
DATED               : May 20, 2014  
INVENTOR(S)        : Leys Page 1 of 1

It is certified that error appears in the above-identified patent and that said Letters Patent is hereby corrected as shown below:

On the Title Page, Col. 1, in Item "(73)", under "Assignee", delete "Entrgeris," and insert -- Entegris, --, therefor.

In the Claims

In Col. 8, Line 58, in Claim 8, delete "manifold of" and insert -- manifold assembly of --, therefor.

In Col. 8, Line 60, in Claim 9, delete "manifold of" and insert -- manifold assembly of --, therefor.

In Col. 8, Line 63, in Claim 10, delete "manifold of" and insert -- manifold assembly of --, therefor.

In Col. 10, Line 8, in Claim 12, delete "manifold of" and insert -- manifold assembly of --, therefor.

In Col. 10, Line 11, in Claim 13, delete "manifold of" and insert -- manifold assembly of --, therefor.

Signed and Sealed this  
Seventeenth Day of February, 2015

Michelle K. Lee  
*Deputy Director of the United States Patent and Trademark Office*

UNITED STATES PATENT AND TRADEMARK OFFICE
CERTIFICATE OF CORRECTION

PATENT NO. : 8,726,935 B2
APPLICATION NO. : 12/373840
DATED : May 20, 2014
INVENTOR(S) : Leys Page 1 of 1

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1116 days.

Signed and Sealed this
Eleventh Day of August, 2015

Michelle K. Lee
*Director of the United States Patent and Trademark Office*